Jan. 19, 1971     W. V. BRATKOWSKI     3,555,894

STRAIN GAUGE TRANSDUCER APPARATUS

Filed April 25, 1966     4 Sheets-Sheet 1

INVENTORS
Walter V. Bratkowski &
Paul F. Pittman
BY
ATTORNEY

Jan. 19, 1971 W. V. BRATKOWSKI 3,555,894

STRAIN GAUGE TRANSDUCER APPARATUS

Filed April 25, 1966 4 Sheets-Sheet 2

Jan. 19, 1971   W. V. BRATKOWSKI   3,555,894
STRAIN GAUGE TRANSDUCER APPARATUS
Filed April 25, 1966   4 Sheets-Sheet 3

United States Patent Office 3,555,894
Patented Jan. 19, 1971

3,555,894
STRAIN GAUGE TRANSDUCER APPARATUS
Walter V. Bratkowski, McKeesport, and Paul F. Pittman, Pittsburgh, Pa., assignors to Westinghouse Electric Corporation, Pittsburgh, Pa., a corporation of Pennsylvania
Filed Apr. 25, 1966, Ser. No. 544,739
Int. Cl. G01b 7/16
U.S. Cl. 73—88.5                                              1 Claim

ABSTRACT OF THE DISCLOSURE

There is disclosed strain or vibration determining apparatus in which the transducer responsive to strain (27, FIGS. 1, 1A, 2, 2A) or to vibration (131, FIGS. 6 and 7) is structurally integrated with a monolithic amplifier (29, FIGS. 1, 1A, 2, 2A; 149, FIG. 7). Precision of measurement is thus materially improved because the conductors between the gauge and the amplifier are short.

---

This invention relates to the art of transducers such as piezoelectric and resistance accelerometers, strain gauges, thermocouples, slide wire resistors, velocity gauges, pressure transducers, thermocouples and the like and has particular relationship to transducer units for measuring strain of acceleration of stressed or vibrating bodies.

It is necessary to determine the strains and accelerations to which such structures as the shafts of rolling mills and the wings and bodies of such vehicles as aircraft, missiles and satellites are subjected and frequently to monitor these strains and accelerations during the flights of the vehicles. For these purposes, strain gauges and accelerometers may be mounted on the parts to be tested or monitored. Such transducers respond electrically to the strains imposed on the parts or to the vibrations of these parts and produce signals which may be observed to determine the magnitude of the strain or the acceleration. To achieve the proper testing or monitoring, it is necessary that a large number of strain gauges and accelerometers be mounted on different parts of the vehicles. The transducers so mounted produce signals of relatively low magnitude which must be amplified substantially to produce observable response.

In accordance with the teachings of the prior art, the amplifier which may be connected to the gauges or the accelerometers has dimensions of appreciable magnitude and cannot be mounted on the wings or other parts under observation. The transducers are then mounted where the vibration or strain takes place and are connected through cables to amplifiers and indicators within the cabins of the vehicles or in analogous positions. This prior art practice has the disadvantage that the signals from the transducers to the amplifiers, being relatively small, are distorted and to a large extent obscured by the electrical pickup of the cables. While the cables may be shielded to minimize the pickup, the signals derived from the transducers are so small that even small pickup or noise in the cables obscures the signal which is sought.

It is accordingly an object of this invention to overcome the above described disadvantage and to provide strain and acceleration measuring apparatus which shall produce appreciable signals at the point of the vibration that can be readily observed and evaluated.

In accordance with this invention, a strain gauge unit is provided which includes as an integrated structure a strain or vibration measuring means and a monolithic amplifier. Where the strain gauge is of the variable-resistance type which responds to the straining of a body part, the strain gauge and monolithic amplifier may be assembled side-by-side. The strain gauge is typically a resistance wire and is secured to the part under observation at the position where the strain is being observed in such manner that the wire is tensioned or compressed by the straining of the part; the monolithic amplifier is disposed adjacent to the strain gauge and connected to it in amplifying relationship by short conductors. The straining of the part under observation changes the resistance of the strain gauge producing a signal which is impressed on the input of the amplifier. In the practice of this invention, the amplification produced by a typical amplifier may be 2500 or higher. The signal output of the amplifier may then be readily observed on an indicator at a remote point from the position where the straining takes place.

The amplifier is in this apparatus throughout under the same ambient conditions and unbalance by reason of different ambient conditions in different parts of the amplifier is avoided. This is particularly advantageous where the amplifier is of the balanced type.

Where vibration is to be observed, a gauge similar to the strain-gauge but with the resistance wires pretensioned may be mounted as an accelerometer or a piezoelectric accelerometer may be mounted together with the monolithic amplifier in a small container. The container is disposed on the part which is under observation at the point of observation. The vibration of this part impresses acceleration on the resistance accelerometer or on the piezoelectric crystal producing a signal which is amplified by the monolithic amplifier and may be readily observed remotely from the amplifier.

Where the strain gauge is of the resistance type, the strain gauge resistance components are connected in a balanced bridge network on which a potential is impressed. To observe the strain or the effects of vibration, the voltage produced by the unbalance of the bridge is amplified and the amplified signal produces an indication of the strain or vibration. In accordance with a further aspect of this invention, a single power-supply mounted with the indicator in the cockpit of the vehicle or in an analogous position provides the voltage both for the bridge and for the amplifier. In this case, it is necessary that to supply power for the bridge and amplifier, only two conductors extend from the power supply to the position where the strain is under observation in addition to the indicator conductors. These two supply conductors serve to provide the necessary voltage for both the bridge and the monolithic amplifier. It is necessary that both the input and output terminals of the bridge be isolated from ground. For this purpose, resistors are provided in the amplifier 29 to produce a bridge supply voltage yielding the proper DC bias at amplifier input terminals 47 and 49.

For a better understanding of this invention, both as to its organization and as to its method of operation together with additional advantages and objects thereof, reference is made to the following description of specific embodiments taken in connection with the accompanying drawings, in which.

Figure 1:
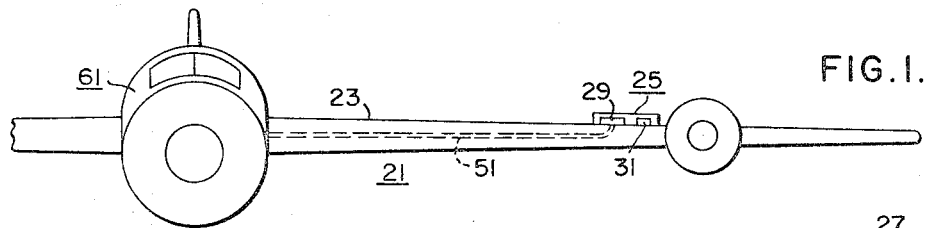
FIG. 1 is a generally diagrammatic view of a member subject to flexing having a strain-gauge unit in accordance with this invention mounted thereon.
Figure 1A:
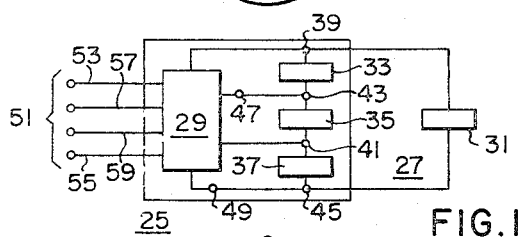
FIG. 1A is a fragmental view enlarged showing the unit mounted in the member.

FIGS. 1 and 1A show diagramatically aircraft 21 on whose wing 23 a strain-gauge unit 25 according to this invention is mounted. The strain-gauge unit 25 includes strain-gauges 27 and monolithic amplifier 29 connected by short conductors mounted together on the wing 23. The amplifier 29 includes the auxiliary electrical components which may in fact be mounted on the wafer or chip or die itself. The strain gauges 27 includes a plurality of wire or foil resistors 31, 33, 35 and 37 of substantially equal resistance connected in a balanced bridge. The bridge has input terminals 39 and 41 on which a potential is impressed and output terminals 43 and 45 connected to the input terminals 47 and 49 of the amplifier 29. A cable 51 including power supply conductors 53 and 55 and conductors 57 and 59 to an indicator or recorder 60 (FIG. 11) extends from the amplifier 29 to the cockpit 61 of the craft.

Resistor 31 is secured to the wing 23 at the position where the strain is to be determined and flexes with the wing. A potential then appears at the output of the bridge which is amplified by the amplifier 29 and produces a signal on indicator 60.

Figure 2A:
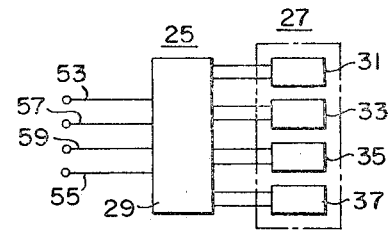
FIGS. 2 and 2A are views similar to FIGS. 1 and 1A respectively showing an alternative mounting of the strain gauge unit.
Figure 2:
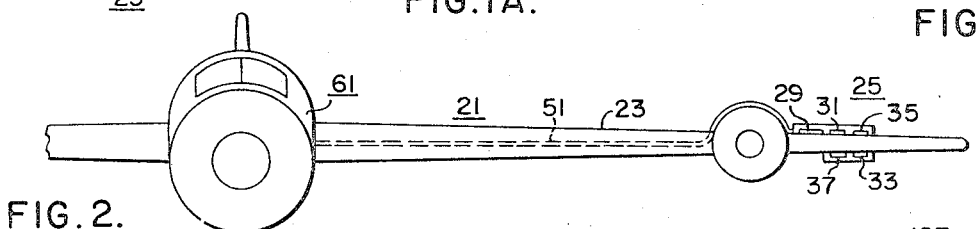

In lieu of only one of the resistors 31 being subjected to the flexing of the wing 23 all four resistors 31, 33, 35 and 37 may be subjected as shown in FIGS. 2 and 2A. But to derive a signal from the bridge differences in resistance must exist during the flexing between the adjacent arms of the bridge defining the voltage terminals 39 and 41. Resistors 31 and 35 are secured to the top of the wing 23 and 33 and 37 to the bottom. On the flexing of the wing one set of these resistors 31–35 or 33–37 is subject to tension and the other set 33–37 or 31–35 to compression.

Figure 4:
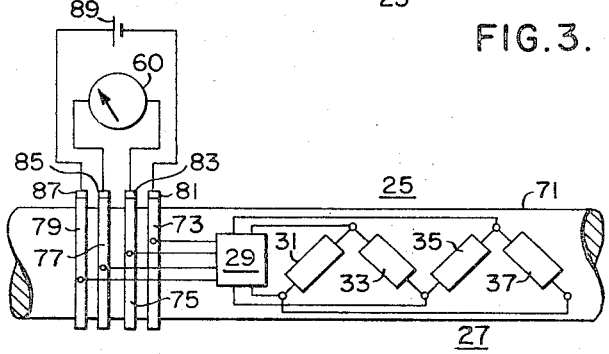
FIG. 4 is a view in side elevation showing the manner in which a strain gauge unit in accordance with this invention is used in meausuring the torsion of a rotating shaft subject to load.
Figure 5:
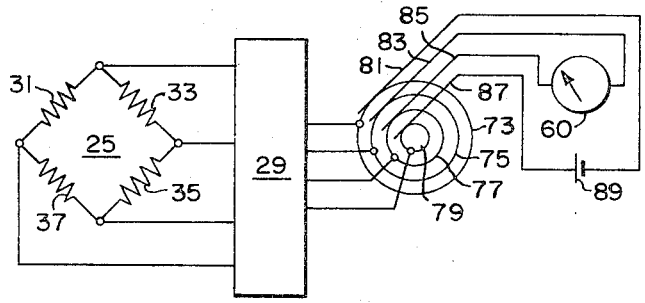
FIG. 5 is a schematic view showing the circuit of the apparatus shown in FIG. 4.

In FIGS. 4 and 5 the strain-gauge unit according to this invention is shown used to determine the torque to which a shaft 71 is subject. The shaft 71 is provided with slip rings 73, 75, 77 and 79 which are insulated from the shaft and connected respectively to brushes 81, 83, 85 and 87. Brushes 81 and 87 are connected to a power supply 89 and brushes 83 and 85 to an indicator or recorder 60. The resistors 31 and 35 and 33 and 37 of the strain-gauge 27 are distributed over the shaft 71 in such a way as to be respectively alternately tensioned and compressed to different extents in dependence upon the torsion in the shaft 71. The signal derived from the strain-gauge 27 is amplified by amplifier 29.

Voltage both for the gauge 27 and for the amplifier 29 are derived from the source 89 through rings 73 and 79. The output of the amplifier 29 is impressed on the indicator or recorder 60 through rings 75 and 77.

Figure 9:
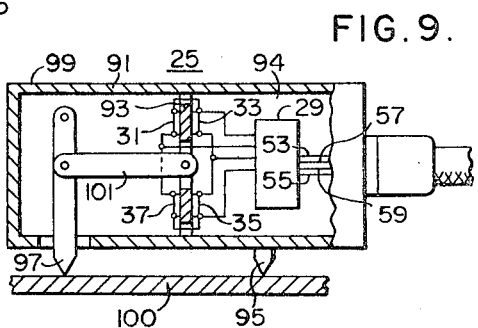
FIG. 9 is a view in section similar to FIG. 7 of a wire resistance strain-gauge displacement unit in accordance with this invention.

The apparatus shown in FIG. 9 discloses a strain-gauge unit including a container 91 having a centrally mounted flexible diaphragm 93. Two of the resistors 31 and 37 are secured to one face of the diaphragm and the other two 33 and 35 to the opposite face. The resistors are so secured as to be stressed when the diaphragm is flexed, one set of resistors 31–37 or 33–35 being tensioned and the other set 33–35 being simultaneously compressed. A monolithic amplifier 29 is disposed in the compartment 94 defined by the diaphragm 93 and the container 91 and is connected in amplifying relationship with the bridge 27. Power supply and indicator conductors 53, 55, 57, and 59 for the gauge 27 and amplifier 29 are transmitted through the cable 51 in communication with the container 91.

A knife-edge support 95 extends from the container 91 under the compartment 94; another knife-edge support 97 extends pivotally from the other compartment 99 of the container. The latter support 97 is linked to the diaphragm 93 through a lever 101.

This unit is used to measure displacements of structures and in practice, the unit is mounted on the structure 100 with the supports 97 and 95 in firm engagement with the structure. Typically, a force may be applied to the container 91 to compress the supports 95 and 97 into the surface of the structure 100. When the structure is displaced, the diaphragm 93 is flexed through the linkage 97–101 and a signal dependent on the flexing is produced.

Figure 10:
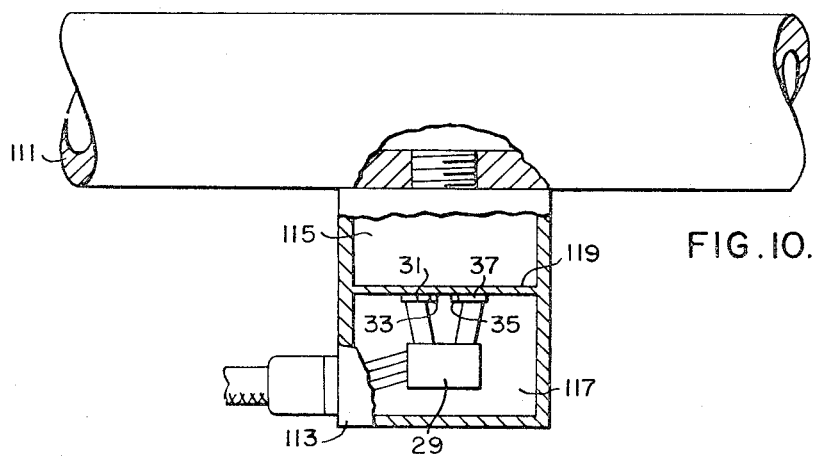
FIG. 10 is a view generally diagrammatic, of a typical pressure-gauge unit according to this invention.

FIG. 10 shows an embodiment of this invention similar to that shown in FIG. 9 in which the unit is used to measure fluid pressure in a fluid conductor 111. This unit includes a container 113 having two compartments 115 and 117 separated by a flexible diaphragm 119. One of the compartments 115 is in communication with the conductor 111 and the pressure of the fluid in the conductor is applied to the diaphragm 119 and flexes the diaphragm. The resistors 31 and 37 and 33 and 35 are secured to the face of the diaphragm 119 on the side of compartment 117. The resistors 31 and 37 are disposed at the right angles so as to be stressed by the flexing of the diaphragm. The chamber 115 of the container 117 includes a monolithic amplifier 29 which is connected in amplifying relationship with the strain-gauge 27. The compartment 117 is in communication with a cable 51 through which the output or indicator and power supply conductors pass. Fluid pressure applied to the diaphragm 119 flexes the diaphragm and stresses the pairs of resistors 31–37 and 33–35 oppositely to produce an indication of the pressure.

Figure 3:
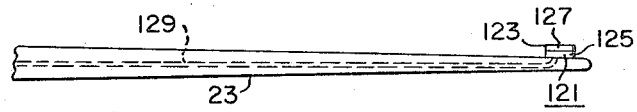
FIG. 3 is a view generally diagrammatic in front elevation of an aircraft having an accelerometer unit in accordance with this invention mounted thereon.

In FIG. 3 an accelerometer unit 121 is shown as mounted on wing 23. The accelerometer unit includes a container 123 within which there is an accelerometer 125 and a monolithic amplifier 127 connected in amplifying relationship with the accelerometer 125. Voltage is supplied and an indication is derived through conductors in a cable 129. The accelerometer 125 produces a voltage dependent on the vibrations of the wing 23 which is amplified and transmitted as a signal to an indicator or other recording device (not shown).

Figure 6:
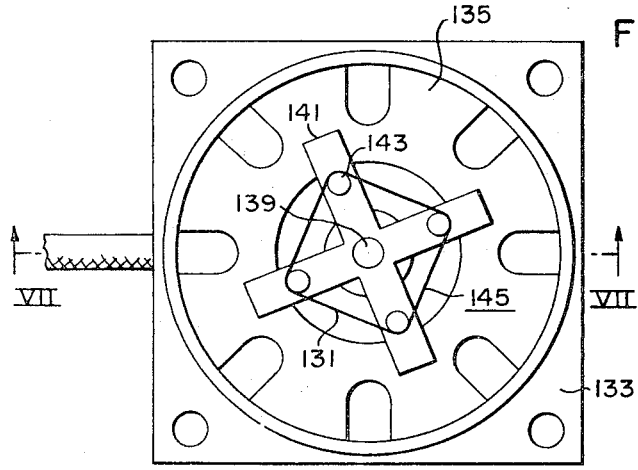
FIG. 6 is a view in top elevation with the cover removed of a resistance-wire accelerometer unit in accordance with this invention.
Figure 7:
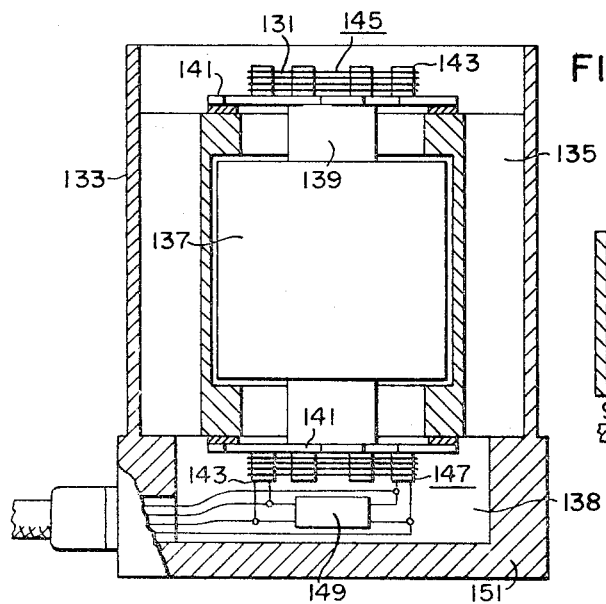
FIG. 7 is a view in section taken along line VII—VII of FIG. 6.

FIGS. 6 and 7 show an accelerometer unit including tensioned resistance wire or foils 131, similar to the resistors 31, 33, 35, 37 of the strain-gauge 27. This unit includes a case 133 having therein a hollow cylindrical support 135 within which there is a seismic mass 137. The lower part of the case 133 defines a compartment 138. A shaft 139 extends through the mass 137 and crossed resilient strips 141 are mounted on each end of the shaft 139. These strips 141 engage the adjacent surfaces of the support 135. Each strip 141 is provided with a pin 143, the pins 143 being at the corners of a square. The resistance wire 131 is wound continuously on the pins 143 at each end to form rectangular frames 145 and 147 of wire; in each case the wire on the frame is tensioned. The lower frame 147 extends into the compartment 138.

In addition a monolithic amplifier 149 is mounted in this compartment.

The wires 131 on each side of the frames 145 and 147 constitute the arms of a bridge. The corners of the frames 145 and 147 are conductively connected so that the bridges formed by each turn of wire are in parallel. The amplifier 149 is connected in amplifying relationship with the bridge in the same manner as in the strain-gauge unit.

The base 151 of the case 133 is in communication with a cable 153 through which voltage supply and indication conductors extend. The unit may be mounted on a wing 23 under observation in the manner shown in FIG. 3.

In the practice of the invention the vibration of the wing 23 causes the seismic mass 137, which is suspended between the resilient cross strips 141, to vibrate. The cross strips 141 are accordingly deflected in turn reducing the tension in one set of opposite resistance wires of the frames 145 and 147 and increasing the tension in the other set of resistance wires. This change in stress produces changes in the resistances of the wires which manifests itself as an alternating signal at the output of the amplifier 149.

Figure 8:
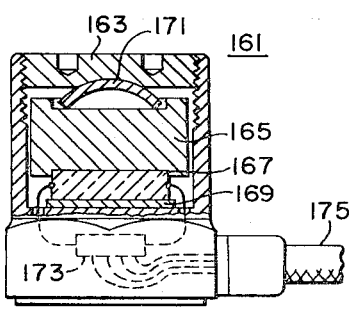
FIG. 8 is a view in section similar to FIG. 7 for an accelerometer unit of the piezoelectric type.

FIG. 8 shows a piezoelectric crystal accelerometer unit. This unit includes a container 161 having a cap 163 at one end. Within the container, a mass 165 and a piezoelectric crystal 167 secured thereto by suitable adhesives are mounted on a base 169. The cass 165 is under compression produced by a flat disc spring 171 of generally circular form. The spring engages the cap 163 at its center and at its ends engages the mass 165. In the base of the container 161, a monolithic amplifier 173 is mounted. The amplifier 173 is connected to the crystal in amplifying relationship. Output conductors from the amplifier and conductor to the power supply pass through a cable 175 in communication with the base of the container 161.

The unit shown in FIG. 8 is mounted on an object under observation. When the object is vibrated, the mass 165 is subjected to periodic acceleration reducing and increasing the compression of the crystal 167. Signals are thus produced which are amplified and indicate the acceleration of the mechanical oscillations.

Figure 11:
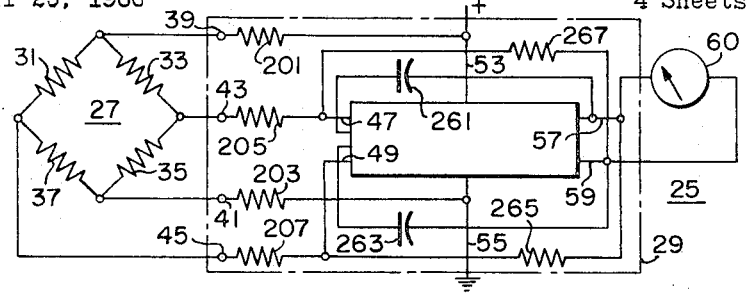
FIG. 11 is a block diagram showing the principal electrical features of an aspect of this invention.

FIG. 11 is a diagram of the strain-gauge unit shown in FIG. 1. Conductor 53 is connected to the hot-pole of the supply and 55 is grounded. Conductors 53 and 55 supply voltage both to the gauge 27 and the amplifier 29. Conductors 53 and 55 are connected to the input terminals 39 and 41 respectively of the bridge through resistors 205 and 203 having equal resistance. The resistors 205 and 203 may be bridge elements such as 31, 33, 35, 37. The output terminals 43 and 45 of the bridge 27 are connected to the input terminals 47 and 49 of the amplifier 29 through resistors 205 and 207 respectively. The output conductors 57 and 59 of the amplifier 29 are connected to the indicator or recorder 60.

Typically, the amplifier may be a WS161 amplifier sold by Westinghouse Electric Corporation with the auxiliary resistors 201 through 207, 265 and 267 and capacitors 261 and 263 mounted adjacent to, or etched on, the wafer. The amplifier has a low impedance input which is matched to the low impedance output of the strain gauge 27.

Figure 12:
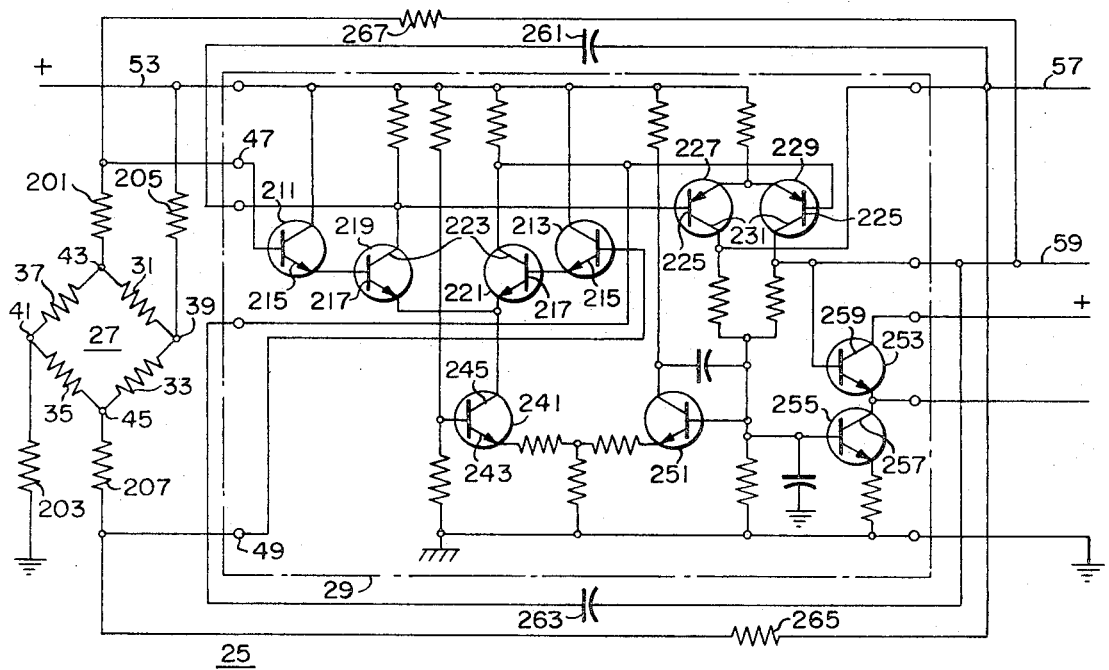
FIG. 12 is a schematic of a strain-gauge unit in accordance with this invention.

As shown in FIG. 12, the amplifier 29 includes input transistor elements 211 and 213 the bases of which are connected to the input terminals 47 and 49. The emitters 215 of the input transistors 211 and 213 are connected to the bases 217 of intermediate amplifying transistors 219 and 221 whose collectors 223 are connected respectively to the bases 225 of the output transistors 227 and 229. A balanced output is derived from the collectors 231 of the output transistors 227 and 229 of the amplifier 29. An additional transistor 241 is provided for regulating the current through transistors 219 and 221. The emitter 243 and collector 245 of this additional transistor 241 are connected in series with transistors 219 and 221.

The current through transistor 241 is controlled by a feedback transistor 251 which is connected to be controlled in dependence upon the current conducted by the output transistors 227 and 229.

For optional single ended output, a pair of transistors 253 and 255 are connected in series with the collector 231 of one of the output transistors 229. The single ended output is derived from the collector 257 of transistor 255. The collector 259 of the transistor 253 is connected to the hot pole of the supply.

For the purpose of controlling the frequency response of the amplifier, the capacitors 261 and 263 are connected between each output conductor 57 and 59 and the bases 225 of the associated transistors 227 and 229 respectively. The gain stability of the amplifier 29 is improved by negative feedback connections through resistors 265 and 267 from the outputs 57 and 59 to the opposite inputs 49 and 47 respectively.

The strain-gauge unit shown in FIG. 12 has excellent properties both as to sensitivity and as to linearity. The following Table I shows the data derived by applying different loads L to a cantilever beam and observing the voltage input and output of the amplifier 29 and the gain.

TABLE I

| L (grams) | Strain ($10^{-6}$ in./in.) | Input E (volts x $10^{-6}$) | Output E (volts) | Gain |
|---|---|---|---|---|
| 0 | 0 | | 0 | |
| 20 | 20 | | | |
| 40 | 40 | | | |
| 60 | 60 | | | |
| 80 | 80 | | | |
| 100 | 105 | 157.5 | .4 | 2,540 |
| 120 | 130 | | | |
| 140 | 150 | | | |
| 160 | 180 | | | |
| 180 | 200 | | | |
| 200 | 220 | 330 | .8 | 2,430 |
| 220 | 240 | | | |
| 240 | 260 | | | |
| 260 | 280 | | | |
| 280 | 310 | | | |
| 300 | 330 | 495 | 1.2 | 2,430 |
| 350 | 380 | | | |
| 400 | 440 | 660 | 1.6 | 2,430 |
| 500 | 550 | 825 | 2.0 | 2,430 |
| 550 | 610 | | | |
| 600 | 660 | 990 | 2.5 | 2,520 |
| 650 | 720 | | | |
| 700 | 780 | 1,170 | 2.9 | 2,490 |
| 750 | 830 | | | |
| 800 | 890 | 1,335 | 3.4 | 2,550 |
| 850 | 940 | | | |
| 900 | 1,000 | 1,500 | 3.8 | 2,540 |
| 950 | 1,050 | | | |
| 1,000 | 1,110 | 1,665 | 4.2 | 2,530 |
| 0 | 0 | | | |

The consistency of the gain is an indication of the linearity of the unit. It is seen that the gain is equal to 2430 over the range of loading between 200 grams and 500 grams and does not materially depart from this magnitude over the range of loading between 100 grams and 1000 grams.

Figure 13:
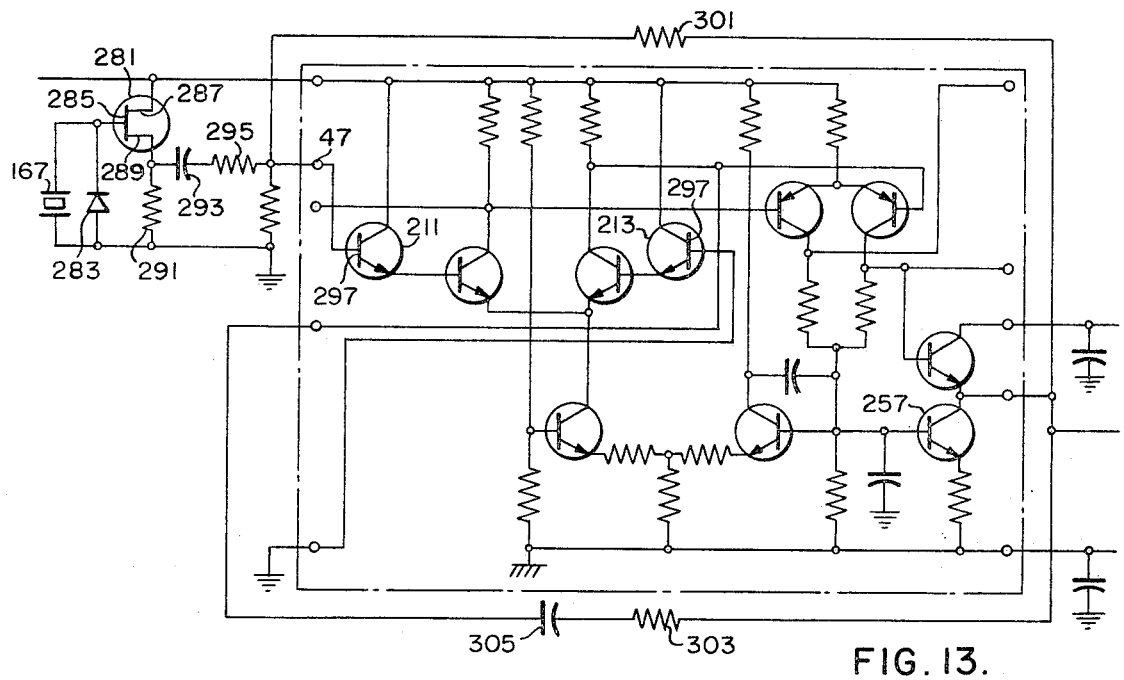
FIG. 13 is a schematic of a piezoelectric accelerometer unit in accordance with this invention.

The piezoelectric crystal 167 operates into a relatively high output impedance. It is then necessary that the impedance input to the monolithic amplifier 29 be high. For this purpose, as shown in FIG. 13, a field-effect transistor 281 is interposed between the input to the monolithic amplifier 29 and the crystal. The crystal 167 is connected across a biasing diode 283 between the gate 285 of the field-effect transistor 281 and ground. One of the electrodes 287 of the field-effect transistor is connected to the hot pole of the supply and the other 289 is connected to ground through a load resistor 291. The output of the field-effect transistor 281 is derived through a capacitor 293 and a resistor 295 and is impressed on the base 297 of one of the input transistors 211 of the amplifier input 47. The base 297 of the other input transistor 213 is connected to ground. In this case single-ended output is derived from transistor 257. The output produced in this case is of the alternating-current type and lends itself readily to derivation through single ended output terminals. Negative feedback is provided through a resistor 303 and capacitor 305 and through a resistor 301. The former feedback connection sets the frequency and the latter improves the gain stability of the amplifier.

Figure 14:
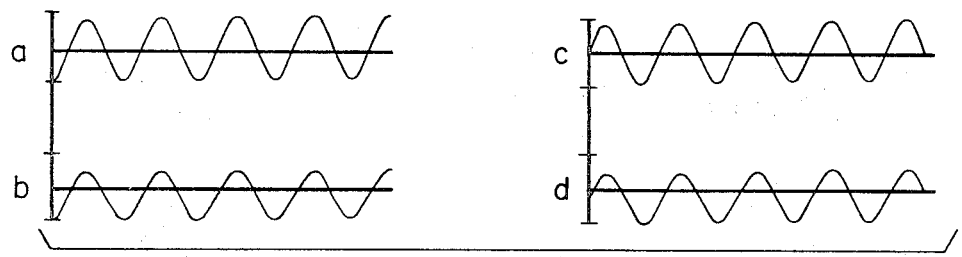
FIGS. 14 through 18 are oscillograms comparing the operation of apparatus in accordance with this invention with prior art apparatus.

FIGS. 14 through 18 present comparisons by oscillograms between the outputs at different frequencies, derived from a unit of the type shown in FIG. 13 and corresponding outputs derived from prior-art apparatus. In each case the oscillograms produced by a unit according to this invention are labeled *a* and *c* and the prior-art oscillograms *b* and *d*. FIG. 14 is produced by vibrating crystals in a unit according to this invention and in a prior art unit at 50 cycles per second with a Goodman vibrator. In this case, the acceleration in G's was approximately 1.25 and the amplitude of the vibration in each case was approximately .005 inch.

Figure 15:
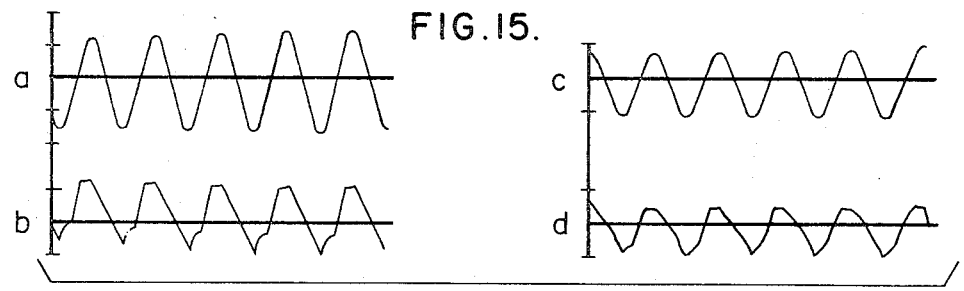
Figure 16:
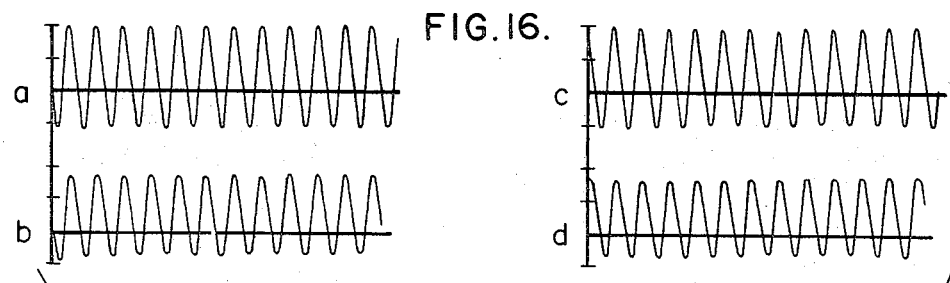
Figure 17:
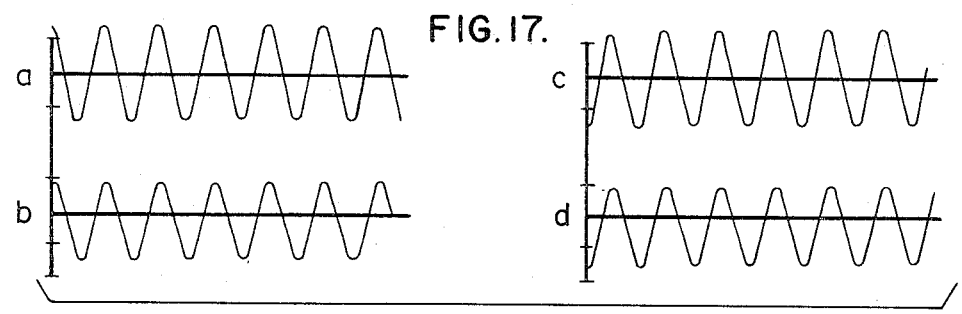
Figure 18:
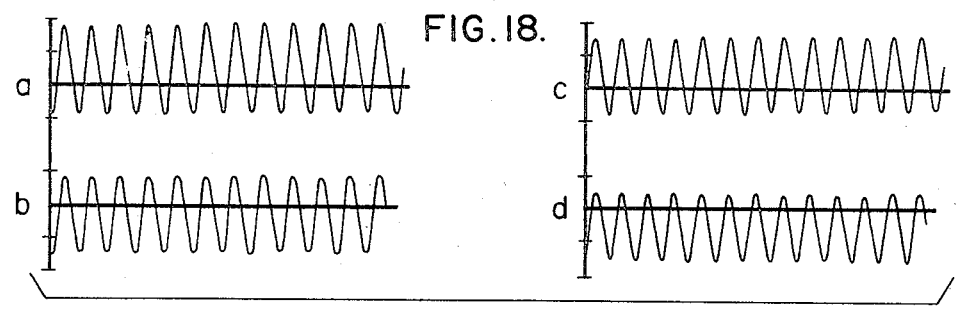

FIG. 15 shows oscillographs produced at one cycle per second. In this case, the crystal in each case was mounted on a cantilever beam and the beam was vibrated. The acceleration in G's in the case was approximately .03 G's and the amplitude approximately 3/10 of an inch. The smoothness of the oscillograms produced in the practice of this invention as compared to the oscillograms produced with the prior apparatus is significant. FIG. 16 shows corresponding comparisons at 500 cycles per second with the acceleration about 25 G's and the amplitude about .001 inch.

While preferred embodiments of this invention have been disclosed herein many modifications thereof are feasible. This invention then is not to be restricted except insofar as is necessitated by the spirit of the prior art.

What is claimed is:

1. Apparatus for determining the condition of a member, the said apparatus including a transducer unit having a transducer, requiring voltage for its operation, which when appropriately positioned on said member, is responsive to said condition by producing an electrical signal, and said transducer unit also having an amplifier in said unit, said amplifier also requiring voltage for its operation and being electrically connected by conductors to said transducer to amplify said signal, said transducer and amplifier being side-by-side in said unit, so that said conductors are short to minimize pickup, said unit being mounted on said member with said transducer appropriately positioned on said member to respond to said condition, said apparatus also including unitary voltage-supply means and condition-indicating means, both remote from said transducer unit, and voltage supply conductors between said voltage-supply means and said unit conducting voltage from said voltage-supply means both for said transducer and for said amplifier and indicating signal conductors from said amplifier to said condition indicating means for conducting the amplified signal of said amplifier to said condition-indicating means, the said amplier being a monolithic amplifier having a high amplification of the order of several thousand so that the said condition is readily determinable from the indication on said condition-indicating means, the said amplier being of the DC type and having a ground connection, and the said transducer being an impedance bridge having an output which supplies DC bias to said amplifier, one of the said voltage-supply conductors being hot and another being grounded, and the transducer having input terminals and output terminals, said voltage-supply conductors being connected to said input terminals through resistors which isolate the input terminals from ground, and the output terminals of said transducer being also isolated from the amplifier by resistors.

References Cited

UNITED STATES PATENTS

| | | | |
|---|---|---|---|
| 3,000,208 | 9/1961 | Piazza, Jr. | 73—136 |
| 3,144,522 | 8/1964 | Bernstein | 179—100.41 |
| 3,161,045 | 12/1964 | Ames, Jr. | 73—88.5 |
| 3,277,698 | 10/1966 | Mason | 73—88.5 |
| 3,292,057 | 12/1966 | Touchy | 307—308 |
| 3,319,140 | 5/1967 | Toussaint et al. | 317—235 |
| 3,336,795 | 8/1967 | Arattawa | 73—136 |
| 3,339,085 | 8/1967 | Schmid et al. | 307—289 |
| 3,251,223 | 5/1966 | Barg | 73—136 |

FOREIGN PATENTS

| | | | |
|---|---|---|---|
| 1,075,864 | 2/1960 | Germany | 73—136 |

OTHER REFERENCES

Perry et al., "The Strain Gage Primer," McGraw-Hill, 1962, pp. 52, 53, 84, 203–205, 208, TA 413 P4 C.3.

Harris "Electrical Measurements," Wiley, 1957, p. 761, QC535 H35 C.2.

Kaufman "Theory of a Monolithic Null Device and Some Novel Circuits," Proceedings of the IRE, vol. 48, September 1960, pp. 1540–1545.

Rosenblatt "New Units Test Merit of Thin Films on Monolithics," Electronic Design, vol. 12, #11, May 25, 1964, pp. 12–15.

JAMES J. GILL, Primary Examiner

H. GOLDSTEIN, Assistant Examiner

U.S. Cl. X.R.

73—71.4, 136, 517